Sept. 13, 1955         A. C. PETSCHE         2,717,577
PORTABLE BIRD PERCH
Filed May 24, 1954
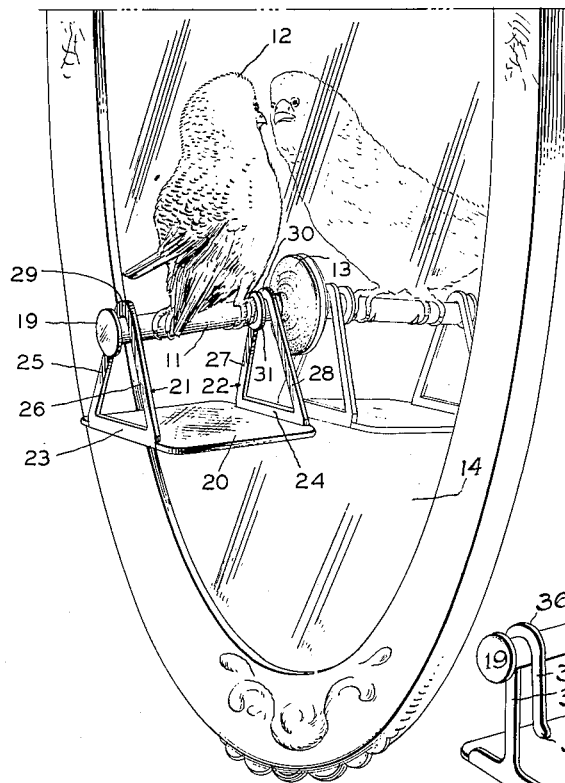
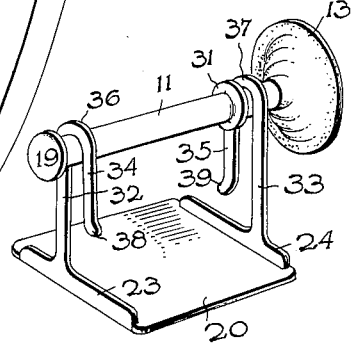
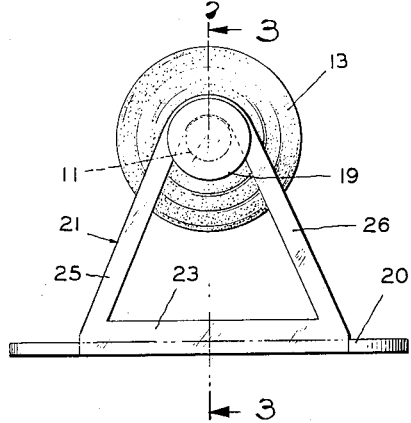
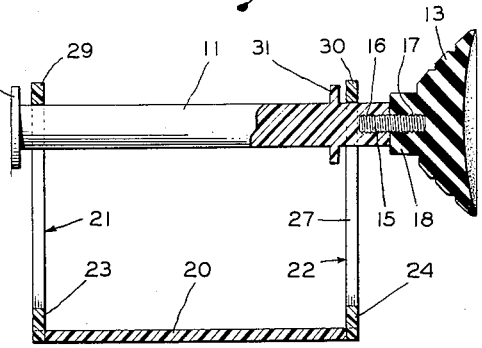
INVENTOR
August C. Petsche,
BY Albert J. Kramer
ATTORNEY 2,717,577

PORTABLE BIRD PERCH

August C. Petsche, Arlington, Va.

Application May 24, 1954, Serial No. 431,940

3 Claims. (Cl. 119—26)

This invention relates to bird perches and is more particularly concerned with a portable perch for pet household birds.

One of the objects of this invention is the provision of a bird perch which can be quickly and easily attached and removed from a flat surface, such as a wall or mirror.

Another object of the invention is the provision of a bird perch which is composed of simple and inexpensive parts and which is attractive and neat in appearance.

A further object of the invention is the provision of a bird perch which is particularly adapted for use by parakeets in the home. Parakeets are instinctively vain and when released from a cage in the home, will seek out a reflecting surface, such as a mirror. By the use of the present invention, a perch for parakeets can be provided immediately adjacent a mirror or other reflecting surface in the home without in any manner injuring or marring the surface and, at the same time, permitting the transfer of the perch from place to place.

Parakeets are, characteristically, also incontinent and a still further object of the invention is to provide, in combination with a perch of the type mentioned a droppings pan or shelf which can be easily and quickly cleaned and which is removable from the perch for this purpose without disturbing the placement of the perch itself.

These and other objects and advantages of the invention will be apparent from the following description, considered together with the accompanying drawing.

In the drawing:

Fig. 1 is a perspective view of an embodiment of the invention attached to a mirror and showing a parakeet perched thereon.

Fig. 2 is a side elevational view of the same embodiment.

Fig. 3 is a longitudinal sectional view along the line 3—3 of Fig. 2.

Fig. 4 is perspective view of a modified form of the embodiment.

Referring with more particularity to the drawing in which like numbers of reference designate like parts throughout the several views, the embodiment illustrated comprises a horizontal bar 11, preferably cylindrical and of sufficient length to accommodate a bird for which it is to be used, such as a parakeet 12. Although the bar 11 may be made of any solid material desired, it is preferably made of a plastic material, such as Lucite or Plexiglas, to enhance appearance and facilitate cleaning. Glass or glazed ceramic materials may also be used, although it is to be understood that this invention is not limited to the use of any specific materials.

To one end of the bar 11, there is secured a rubber suction cup 13 for attachment to a smooth vertical surface, such as the mirror 14. The suction cup 13 may be attached to the bar 11 in any suitable manner. For illustrative purposes it is shown attached by means of a threaded rod 15 engaging a threaded recess 16 in the end of the bar 11 and a recess 17 in the adjacent neck portion 18 of the suction cup 13. However, other means may be used. For example, the neck portion 18 may be provided with a recess larger than the recess 17 for frictionally engaging the adjacent end of the rod 11.

The opposite end of the bar 11 is provided with a button flange 19, the purpose of which will be explained hereinafter.

Beneath the bar 11, a horizontal droppings shelf 20 is disposed and is supported by a pair of suspenders 21 and 22 on the bar 11. The suspenders 21 and 22 are triangular in shape, having each a lower base 23 and 24, respectively, secured to or integral with the shelf 20, and side members 25, 26 and 27, 28. If desired, the base portions 23 and 24 may be dispensed with and the members 25, 26 and 27, 28 attached directly to the shelf 20. The shelf and suspenders are preferably of a plastic material which can be either molded in one piece or, as illustrated in the drawing, cemented or welded together.

Each pair of side members 25, 26 and 27, 28, converge upwardly in the general shape of an inverted V, forming a loop and are preferably rounded at the top to provide curved bearing portions 29 and 30 which overlie and rest upon the bar 11, substantially as shown. The space between the members 25 and 26 and the space between the members 27 and 28 are larger than the button flange 19. Accordingly, it is possible to remove the shelf 20 from the bar 11 by simply lifting it sufficiently high to disengage it from the flange 19 and moving it axially thereover. It may just as easily be replaced and when in place, it is prevented from slipping off the end by the button flange.

The removal and replacement of the shelf 20 is important for cleaning purposes. By the means provided, this may be done without in any way disturbing the placement of the perch bar 11.

A flange 31 may be provided on the bar 11 adjacent the suspender 22 in substitution of the flange 19, or it may, as a safety measure, be provided in addition to the flange 19 to minimize displacement of the suspenders from the bar 11 by the movements of the bird, such as might result from his playful actions.

In the modified form of Fig. 4, there is illustrated a type of suspender in which the arms thereof are parallel instead of convergent. Each suspender comprises a short arm 34, 35 and a long arm 32, 33, respectively, connected together at the top by a curved or bight portion 36, 37. The distance between the arms 32 and 34 and between the arms 33 and 35 is approximately equal to or slightly greater than the diameter of the bar 11, but less than the diameter of the flanges 19 and 31. Also, the short arms 34 and 35 are positioned so as to lie on opposite sides of the bar 11 and thus provide a proper balance for the shelf 20. The lower ends of the short arms 34 and 35 may also be provided with guide lips 38 and 39 forming each an open loop to facilitate placement of the suspenders on the bar 11. With this embodiment, the shelf may be removed and replaced from the bar 11 by moving it upwards, rather than endwise.

Having thus described my invention, I claim:

1. A bird perch comprising a perch bar, means on one end of the bar for removably attaching it to a vertical surface, a droppings shelf disposed beneath the bar, support members attached to and projecting upwardly from the shelf, said members having each an open loop portion at the top overlying and resting upon the perch bar, said bar having an outwardly extending flanged portion adjacent each of the connecting portions on the side thereof facing the other end of the bar.

2. A bird perch comprising a perch bar, means on one end of the bar for removably attaching it to a vertical surface, a droppings shelf disposed beneath the bar, a pair of rigid support members rigidly attached to and projecting upwardly from the shelf, said members each having a loop portion at the top overlying and resting upon the perch bar, said bar having an outwardly extending flanged portion adjacent each of the loop portions on the side thereof facing the other end of the bar.

3. A bird perch consisting essentially of a perch bar, a suction cup secured to one end of the perch bar for removably attaching it cantilever fashion to a vertical surface, a shelf to catch droppings of birds perched on the perch bar, a pair of rigid support members rigidly secured to and projecting upwardly from the shelf, said members each having a loop portion at the top to normally overlie and rest upon the perch bar, said bar having an outwardly extending flanged portion adjacent the normal position of the said loop portions on the sides thereof facing the other end of the bar.

References Cited in the file of this patent

UNITED STATES PATENTS

| | | |
|---|---|---|
| D. 86,014 | Diller | Jan. 19, 1932 |
| 910,298 | Lindemann | Jan. 19, 1909 |
| 1,055,387 | Conner | Mar. 11, 1913 |
| 2,484,343 | Hawes | Oct. 11, 1949 |
| 2,675,781 | Bielefeld | Apr. 20, 1954 |